S. MOLNÁR.
RAT TRAP.
APPLICATION FILED JAN. 20, 1912.
1,029,551.
Patented June 11, 1912.
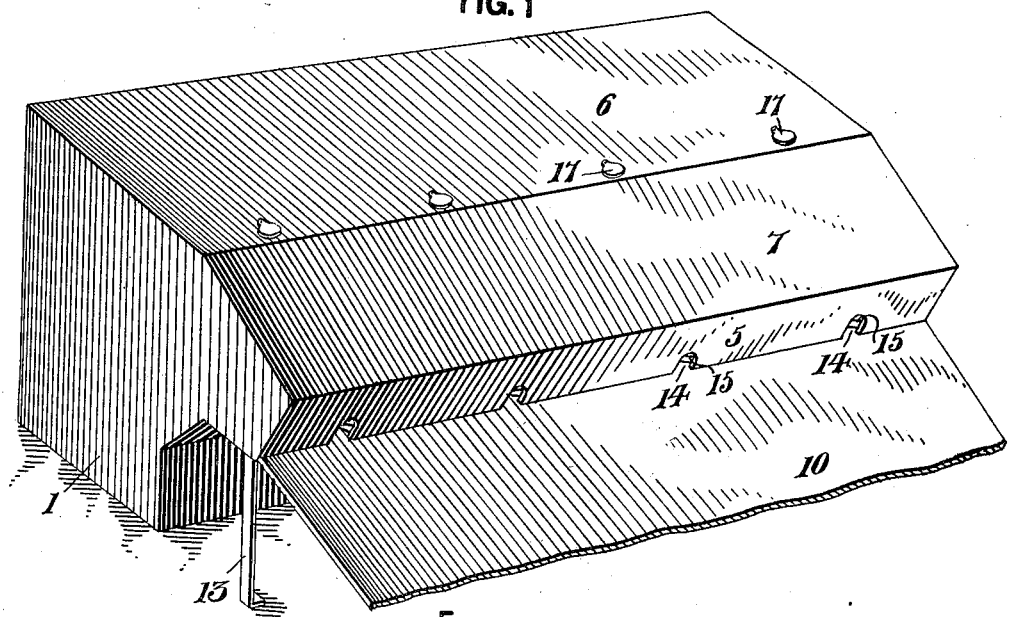
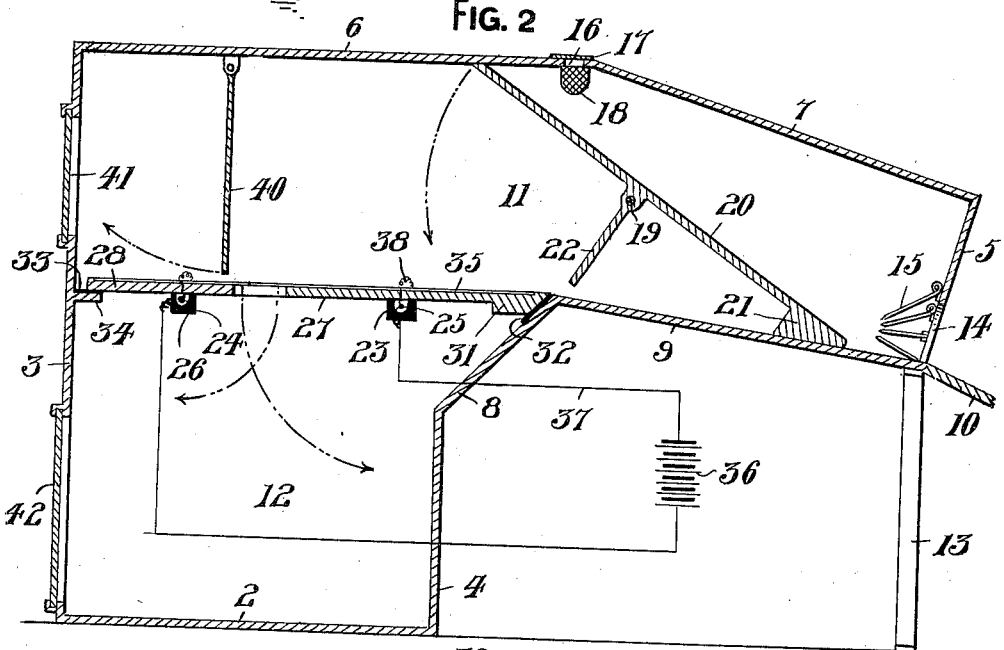
WITNESSES:
INVENTOR.
S. Molnár
BY
ATTORNEYS

UNITED STATES PATENT OFFICE.

STEVE MOLNÁR, OF HOMESTEAD, PENNSYLVANIA, ASSIGNOR OF ONE-FOURTH TO MIKE KOSZTOTANYI, ONE-FOURTH TO JOE PENTEK, AND ONE-FOURTH TO CHARLES KUHN, ALL OF HOMESTEAD, PENNSYLVANIA.

RAT-TRAP.

1,029,551.   Specification of Letters Patent.   Patented June 11, 1912.

Application filed January 20, 1912. Serial No. 672,263.

*To all whom it may concern:*

Be it known that I, STEVE MOLNÁR, a subject of the King of Hungary, residing at Homestead, in the county of Allegheny and State of Pennsylvania, have invented certain new and useful Improvements in Rat-Traps, of which the following is a specification, reference being had therein to the accompanying drawing.

This invention relates to electric traps for rodents, and the object of my invention is the provision of novel means for enticing a rodent into a trap, electrocuting the rodent therein, and collecting the dead bodies, whereby the bodies of the rodents can be removed after the trap has been successfully used.

I attain the above object by providing a structure in which there are arranged tiltable platforms, two of which are provided with contact bars in circuit with a suitable source of electrical energy, whereby when a rodent treads upon positive and negative bars, a circuit will be completed to electrocute the rodent.

The trap consists of comparatively few parts and can be safely handled and maintained in a sanitary condition.

The invention will be hereinafter specifically described and then claimed, and reference will now be had to the drawing, wherein:—

Figure 1 is a perspective view of a trap in accordance with this invention; Fig. 2 is a longitudinal sectional view of a portion of the trap; and Fig. 3 is a plan of a portion of the tiltable platforms of the trap.

A trap in accordance with this invention comprises end walls 1, a bottom plate 2, a rear wall 3, front walls 4 and 5, a roof plate 6, a complemental roof plate 7, complemental bottom plates 8 and 9, and a gang plank 10 extending from the support of the trap to the edge of the complemental bottom plate 9. These elements form a structure having an entrapping compartment 11, and a receptacle 12 adapted to receive the electrocuted bodies of rodents.

The front wall 5, gang plank 10, and complemental bottom plate 9 are supported by uprights 13, and the front plate 5 has a plurality of openings 14 and inwardly projecting prongs 15. The prongs 15 are carried by the inner sides of the front wall 5 and surround each of the openings 14, these prongs preventing a rodent that has once entered the trap from leaving the same through the openings 14.

At the juncture of the complemental roof plate 7 and the roof plate 6 there are a plurality of openings 16 normally closed by pivoted shutters 17. Suspended beneath each opening is a bait-holder 18, adapted to contain a suitable bait to entice a rodent into the compartment 11. It is preferable to use a bait holder for each of the openings 14.

Arranged transversely in the compartment 11 and supported by the end walls 1 is a rod 19. Fulcrumed upon this rod is a trap door 20, having the lower end or edge thereof weighted, as at 21, to normally remain in engagement with the complemental bottom plate 9, whereby the upper edge of the tiltable trap door will be retained in engagement with the underneath side of the roof plate 6. The trap door 20 will therefore present an inclined way, by which a rodent can approach one of the bait holders. The trap door 20 intermediate the ends thereof has a depending partition 22, and this partition prevents a rodent from passing under the lower edge of the trap door after once having entered the compartment 11. The end walls 1 are provided with bearings of insulation 23 and 24, and journaled in these bearings are shafts 25 and 26 respectively. Mounted upon said shafts are tiltable platforms 27 and 28 and the confronting edges of these platforms are slotted as at 29, to provide alternately arranged tongues 30. The platform 27 is normally maintained in a horizontal position by the weighted edge 31 thereof engaging the strip of insulation 32 carried by the complemental bottom plate 8 of the trap.

A tiltable platform 28 is normally maintained in a horizontal position by the rear edge thereof resting upon a strip of insulation 33, carried by a ledge 34 forming part of a rear wall 3. The platform 28 is balanced, whereby the rear edge thereof will normally retain the forward edge of the platform in a plane with the platform 27.

Arranged upon the platforms 27 and 28 are positive and negative contact bars 35 in circuit with a suitable source of electrical energy as a battery 36. It is preferable to connect the battery 36 by wires 37 to the shafts 25 and 26, and said shafts by wires 38 to the contact bars 35. These contact bars have extensions 39 extending on to the tongues 30, and the advantage of this arrangement is that should a rodent only advance to the edge of the platform 28, the fore feet will contact with extensions 39 and complete the circuit. In other words, a rodent cannot tread upon one of the tongues of the platform 28 without completing the electrical circuit.

To prevent a rodent from jumping on to the rear edge of the platform 28, a partition 40 is pivotally suspended from the roof plate 6.

In order that easy access can be had to the compartments 11 and 12, the rear wall 3 has slide doors 41 and 42, the former permitting of proper electrical connections being made within the compartment 11, and the latter allowing the electrocuted or charged bodies to be removed from the receptacle 12.

It is thought that the operation and utility of the trap will be apparent without further description, and while in the drawing there is illustrated a preferred embodiment of the invention, it is to be understood that the structural elements are susceptible to such variations and modifications as fall within the scope of the appended claims.

What I claim is:—

1. An electric rat trap comprising a structure having an entrapping compartment formed therein and a receptacle, a trap door fulcrumed in said trapping compartment and having the lower edge thereof weighted to maintain the upper edge thereof in engagement with the roof of said structure, bait holders supported by said structure adjacent to the upper edge of said trap door, bearings of insulation carried by the end walls of said structure, tiltable platforms supported by said bearings and having the confronting edges thereof slotted to provide longitudinally arranged tongues, and contact bars arranged upon said platforms with the extensions thereof extending on to said tongues and each forming one terminal of an electric circuit bridged by the rat.

2. In an electric rat trap, the combination with a suitable source of electrical energy, of a structure having bottom plates, roof plates, and front plates, one of said plates having openings formed therein, a gang plank having the upper edge thereof terminating at the openings of said front plate, bait holders carried by said roof plates, a tiltable trap door arranged between said end walls with the lower edge of said trap door weighted and in proximity to the openings of said front walls and the upper edge of said trap door extending in proximity to said bait holders, tiltable platforms arranged between said end walls, and contact bars arranged upon said tiltable platforms and each forming one terminal of an electric circuit bridged by the rat and communicating with said source of energy.

3. In an electric rat trap, the combination with a suitable source of electrical energy, of a structure having an entrapping compartment formed therein, of a receptacle adapted to receive rodents from said compartment, a trap door fulcrumed within said entrapping compartment and having the forward edge thereof weighted to maintain the upper edge thereof against the roof of said structure, tiltable platforms normally supported in a horizontal position within said structure, tongues carried by the confronting edges of said platforms, contact bars arranged upon said platforms and each forming one terminal of an electric circuit bridged by the rat and communicating with said source of energy, extensions carried by said bars and extending on to said tongues, and slide doors carried by one of the walls of said structure whereby easy access can be had to the compartments of said structure.

In testimony whereof I affix my signature in the presence of two witnesses.

STEVE MOLNÁR.

Witnesses:
 MAX H. SROLOVITZ,
 CHRISTINA T. HOOD.

---

Copies of this patent may be obtained for five cents each, by addressing the "Commissioner of Patents, Washington, D. C."